(12) United States Patent
Park et al.

(10) Patent No.: US 10,296,940 B2
(45) Date of Patent: May 21, 2019

(54) METHOD OF COLLECTING ADVERTISEMENT EXPOSURE DATA OF GAME VIDEO

(71) Applicant: MINKONET CORPORATION, Seoul (KR)

(72) Inventors: Kyung Soo Park, Gyeonggi-do (KR); Tae Woo Kim, Gyeonggi-do (KR); Dong Hwal Lee, Seoul (KR)

(73) Assignee: MINKONET CORPORATION, Seoul (KR)

( * ) Notice: Subject to any disclaimer, the term of this patent is extended or adjusted under 35 U.S.C. 154(b) by 348 days.

(21) Appl. No.: 15/247,922

(22) Filed: Aug. 26, 2016

(65) Prior Publication Data

US 2018/0060906 A1 Mar. 1, 2018

(51) Int. Cl.
| | | |
|---|---|---|
| *G06Q 30/00* | (2012.01) | |
| *G06Q 30/02* | (2012.01) | |
| *G06K 9/52* | (2006.01) | |
| *A63F 13/61* | (2014.01) | |
| *A63F 13/25* | (2014.01) | |
| *G06T 7/70* | (2017.01) | |

(52) U.S. Cl.
CPC ......... *G06Q 30/0246* (2013.01); *A63F 13/25* (2014.09); *A63F 13/61* (2014.09); *G06K 9/52* (2013.01); *G06Q 30/0242* (2013.01); *G06T 7/70* (2017.01)

(58) Field of Classification Search
CPC . G06Q 30/0277; G06Q 30/0269; G06Q 30/02
See application file for complete search history.

(56) References Cited

U.S. PATENT DOCUMENTS

| 5,487,172 A * | 1/1996 | Hyatt | B60R 16/0373 700/8 |
|---|---|---|---|
| 6,297,853 B1 * | 10/2001 | Sharir | G01S 3/7864 348/153 |
| 7,168,084 B1 * | 1/2007 | Hendricks | H04H 20/10 725/42 |
| 7,721,307 B2 * | 5/2010 | Hendricks | H04H 20/10 725/34 |
| 7,743,330 B1 * | 6/2010 | Hendricks | G11B 27/034 715/706 |

(Continued)

FOREIGN PATENT DOCUMENTS

| JP | H10216357 | 8/1998 |
|---|---|---|
| KR | 20000059204 | 10/2000 |

(Continued)

*Primary Examiner* — Luis A Brown
*Assistant Examiner* — Radu Andrei
(74) *Attorney, Agent, or Firm* — JCIPRNET

(57) ABSTRACT

Provided is a method of collecting advertisement exposure data of a game video, and more particularly, to a method of collecting advertisement exposure data of a game video, in which data on advertisements that are actually exposed to a user from among advertisements applied to a game video, is collected.
According to the method of collecting advertisement exposure data of a game video, data on advertisements that are actually exposed to a user when the user plays, by using a game terminal, a game, to which advertisement objects are applied, may be effectively collected from among game objects applied to a virtual space of the game.

7 Claims, 4 Drawing Sheets

(56) References Cited

U.S. PATENT DOCUMENTS

| | | | | |
|---|---|---|---|---|
| 7,895,076 B2* | 2/2011 | Kutaragi | ............... | A63F 13/77 |
| | | | | 705/14.4 |
| 8,416,247 B2* | 4/2013 | Zalewski | ............... | G06Q 30/02 |
| | | | | 345/474 |
| 9,286,725 B2* | 3/2016 | Vasquez, II | ......... | G06T 19/006 |
| 9,865,005 B1* | 1/2018 | Pottjegort | ......... | G06Q 30/0246 |
| 2002/0120589 A1* | 8/2002 | Aoki | ............... | A63F 13/10 |
| | | | | 705/400 |
| 2004/0104935 A1* | 6/2004 | Williamson | ......... | G06F 3/012 |
| | | | | 715/757 |
| 2004/0204238 A1* | 10/2004 | Aoki | ............... | A63F 13/10 |
| | | | | 463/30 |
| 2005/0216346 A1* | 9/2005 | Kusumoto | ......... | G06Q 30/02 |
| | | | | 705/14.12 |
| 2005/0289590 A1* | 12/2005 | Cheok | ............... | G06Q 30/02 |
| | | | | 725/37 |
| 2007/0078706 A1* | 4/2007 | Datta | ............... | G06Q 30/02 |
| | | | | 705/14.5 |
| 2007/0079331 A1* | 4/2007 | Datta | ............... | A63F 13/12 |
| | | | | 725/42 |
| 2009/0165140 A1* | 6/2009 | Robinson | ......... | G06F 21/10 |
| | | | | 726/26 |
| 2010/0100429 A1* | 4/2010 | McCloskey | ......... | G06Q 30/02 |
| | | | | 705/14.12 |
| 2011/0035274 A1* | 2/2011 | Goel | ............... | G06Q 30/02 |
| | | | | 705/14.45 |
| 2011/0082755 A1* | 4/2011 | Itzhak | ............... | G06Q 30/02 |
| | | | | 705/14.69 |
| 2011/0304699 A1* | 12/2011 | Ito | ............... | H04N 13/117 |
| | | | | 348/47 |
| 2012/0058823 A1* | 3/2012 | Minato | ............... | G06T 19/00 |
| | | | | 463/32 |
| 2012/0122570 A1* | 5/2012 | Baronoff | ............... | A63F 13/655 |
| | | | | 463/31 |
| 2013/0050260 A1* | 2/2013 | Reitan | ............... | G06F 3/011 |
| | | | | 345/633 |
| 2013/0124311 A1* | 5/2013 | Sivanandan | ......... | G06Q 30/02 |
| | | | | 705/14.51 |
| 2013/0185164 A1* | 7/2013 | Pottjegort | ......... | G06Q 30/02 |
| | | | | 705/14.73 |
| 2013/0222371 A1* | 8/2013 | Reitan | ............... | G06T 19/006 |
| | | | | 345/419 |
| 2013/0226758 A1* | 8/2013 | Reitan | ............... | G06Q 40/00 |
| | | | | 705/35 |
| 2013/0232430 A1* | 9/2013 | Reitan | ............... | G06F 3/0484 |
| | | | | 715/765 |
| 2013/0238778 A1* | 9/2013 | Reitan | ............... | H04L 41/00 |
| | | | | 709/223 |
| 2013/0249947 A1* | 9/2013 | Reitan | ............... | G06F 3/011 |
| | | | | 345/633 |
| 2013/0249948 A1* | 9/2013 | Reitan | ............... | G06F 3/011 |
| | | | | 345/633 |
| 2013/0311273 A1* | 11/2013 | Huang | ............... | G06Q 30/0251 |
| | | | | 705/14.48 |
| 2014/0063061 A1* | 3/2014 | Reitan | ............... | G09G 3/003 |
| | | | | 345/633 |
| 2015/0104757 A1* | 4/2015 | Moncrief | ............... | G09B 9/302 |
| | | | | 434/38 |
| 2015/0126279 A1* | 5/2015 | Lyons | ............... | G07F 17/3204 |
| | | | | 463/33 |
| 2015/0170164 A1* | 6/2015 | Marsico | ............ | G06Q 30/0201 |
| | | | | 235/375 |
| 2015/0248785 A1* | 9/2015 | Holmquist | ......... | G06T 19/006 |
| | | | | 345/419 |
| 2016/0117722 A1* | 4/2016 | Garcia | ............... | G06Q 30/02 |
| | | | | 705/14.49 |
| 2016/0132941 A1* | 5/2016 | Han | ............... | H04N 21/234 |
| | | | | 705/14.69 |
| 2016/0148433 A1* | 5/2016 | Petrovskaya | ......... | G06T 19/006 |
| | | | | 345/633 |
| 2016/0361658 A1* | 12/2016 | Osman | ............... | A63F 13/86 |
| 2017/0018010 A1* | 1/2017 | Lee | ............... | G06Q 30/0241 |
| 2017/0249745 A1* | 8/2017 | Fiala | ............... | G06K 9/00671 |
| 2017/0287221 A1* | 10/2017 | Ghaly | ............... | G02B 27/0172 |
| 2018/0061116 A1* | 3/2018 | Mitchell | ............... | G06T 15/20 |

FOREIGN PATENT DOCUMENTS

| | | |
|---|---|---|
| KR | 20030066180 | 8/2003 |
| KR | 20060129983 | 12/2006 |
| KR | 20080035287 | 4/2008 |
| KR | 100932675 | 12/2009 |
| KR | 20100137792 | 12/2010 |
| KR | 20110081400 | 7/2011 |
| KR | 20130025200 | 3/2013 |
| KR | 20130098741 | 9/2013 |
| KR | 101353531 | 1/2014 |
| KR | 101604250 | 3/2016 |
| KR | 101643102 | 8/2016 |
| KR | 101644496 | 8/2016 |
| KR | 20160096019 | 8/2016 |

\* cited by examiner

METHOD OF COLLECTING ADVERTISEMENT EXPOSURE DATA OF GAME VIDEO

TECHNICAL FIELD

The present disclosure relates to a method of collecting advertisement exposure data of a game video, and more particularly, to a method of collecting advertisement exposure data of a game video, in which data on advertisements that are actually exposed to a user from among advertisements applied to a game video, is collected.

BACKGROUND ART

With the growing number of game users, advertisement is also increasingly applied game videos.

Whether advertisement objects that are arranged with game objects in a three-dimensional virtual space are to be displayed on a game terminal or not is determined based on a location or a direction in which or a passage along which a user moves inside a virtual space by controlling the game terminal.

That is, even though a plurality of advertisement objects are arranged in a virtual game space, which advertisement object is to be displayed on a display device of a game terminal is determined by how a game user manipulates the game terminal. According to circumstances, a predetermined game object may not be exposed to the user's game terminal at all even though the game object is arranged in a virtual space of a game. On the other hand, a user may display an advertisement object that is of the user's interest, on a display device of a game terminal and view the advertisement object for a long period of time compared to other game objects.

As described above, when data on advertisements that are actually exposed via a game terminal of a user from among advertisements applied to a game video is collected, various services may be provided based on the data. For example, advertising fees may be charged to advertisers for only those advertisements that are actually exposed to the user.

Accordingly, a method of collecting data on whether advertisements applied to a game play video are actually exposed to a user is required.

DESCRIPTION OF THE INVENTION

Provided is a method of collecting advertisement exposure data of a game video, in which data on whether an advertisement applied to a virtual space of a game is actually exposed to a user is collected.

According to an aspect of the present invention, there is provided a method of collecting advertisement exposure data of a game video, in which exposure information of an advertisement applied to a game operated by game objects arranged in a three-dimensional virtual space is collected, the method comprising: (a) storing a plurality of advertisement objects including a plurality of advertisement marks arranged on an outer surface where an advertisement is exposed, as advertisement object information corresponding to each identification number of the advertisement objects; (b) arranging the advertisement objects included in the advertisement object information in a virtual space of a game; (c) displaying a game play video, in which the game objects are arranged in a virtual space, on a display device of a game terminal; (d) scanning the advertisement marks exposed to a field of view (FOV) of the virtual space displayed on the display device and identifying identification numbers of the advertisement objects corresponding to the advertisement marks; and (e) determining whether an advertisement of an advertisement object corresponding to each advertisement mark is exposed based on the advertisement marks identified in (d), and storing a result of the determining.

According to the method of collecting advertisement exposure data of a game video of the present invention, data on advertisements that are actually exposed to a user when the user plays, by using a game terminal, a game, to which advertisement objects are applied, may be effectively collected from among game objects applied to a virtual space of the game.

DETAILED DESCRIPTION OF THE INVENTION

Hereinafter, a method of collecting advertisement exposure data of a game video according to the present invention will be described more fully with reference to the attached drawings.

Figure 1:
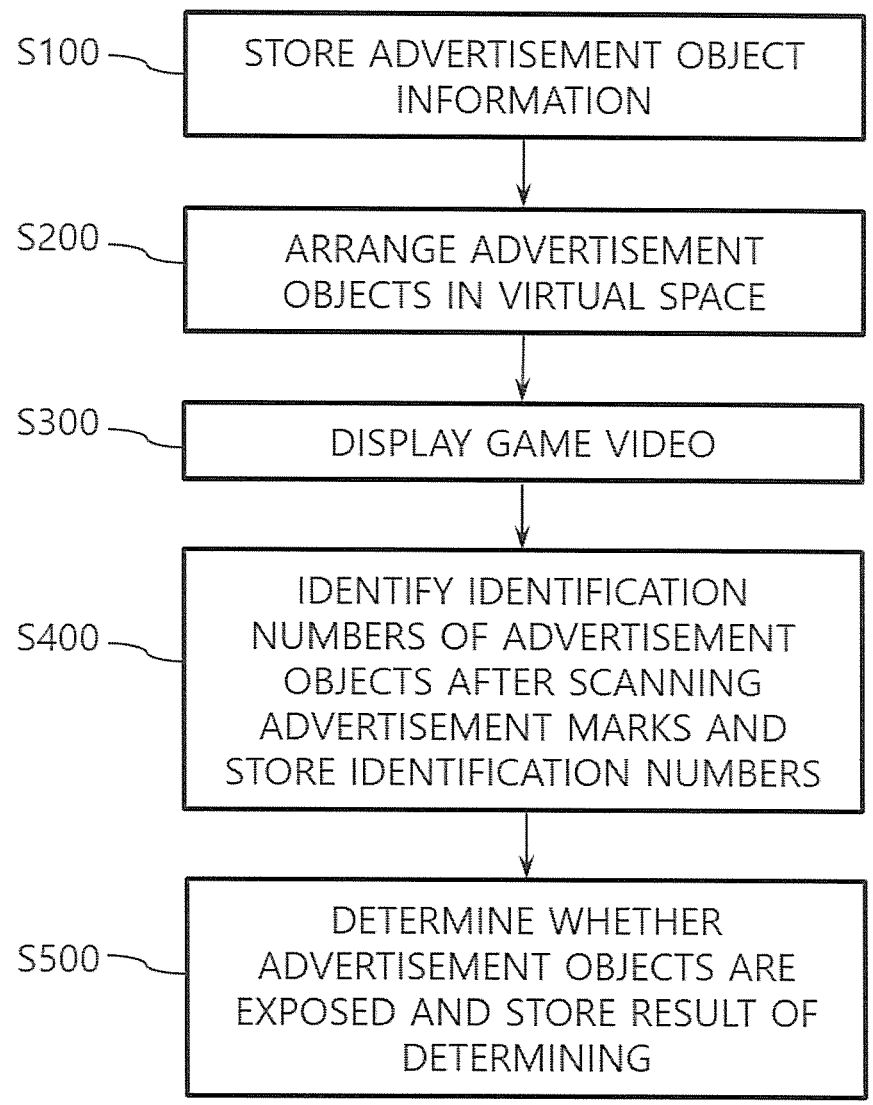
FIG. 1 is a flowchart of a method of collecting advertisement exposure data of a game video, according to an embodiment of the present invention.

FIG. 1 is a flowchart of a method of collecting advertisement exposure data of a game video, according to an embodiment of the present invention.

The present invention relates to a method of identifying whether an advertisement applied to a game video is actually exposed to a user during a game play in virtual space and collecting data on the exposed advertisement. The present invention is applied to games developed using, for example, Unity3D whereby a game is developed by defining movement of objects appearing in a game, such as things, characters, and backgrounds. The present invention is used in object information-based games, in which advertisement objects are arranged in a virtual space and displayed on a display device of game terminal together with game objects during the user's game play.

For a game play, game objects used in a game are already stored on a game terminal. In general, when installing a game on a game terminal, game objects are also stored in the game terminal.

According to the present invention, in order to display also advertisement objects 10 in a virtual space of a game during a game play, the advertisement objects 10 used in a game are also stored in a game terminal in step (a) (S100). The advertisement objects 10 respectively have identification numbers and are stored as advertisement object information in the game terminal. The advertisement objects 10 stored as the advertisement object information include shape information that is displayed three-dimensionally in a virtual space and advertisement content information. The advertisement object information may be stored on a terminal when a game is installed or may be downloaded from a designated server when replaying a stored game video to be stored on a game terminal. Examples of the advertisement objects 10 may be an billboard to be displayed in a virtual space, an ad balloon, an image to be displayed as a texture on an outer surface of a game object.

Figure 2:
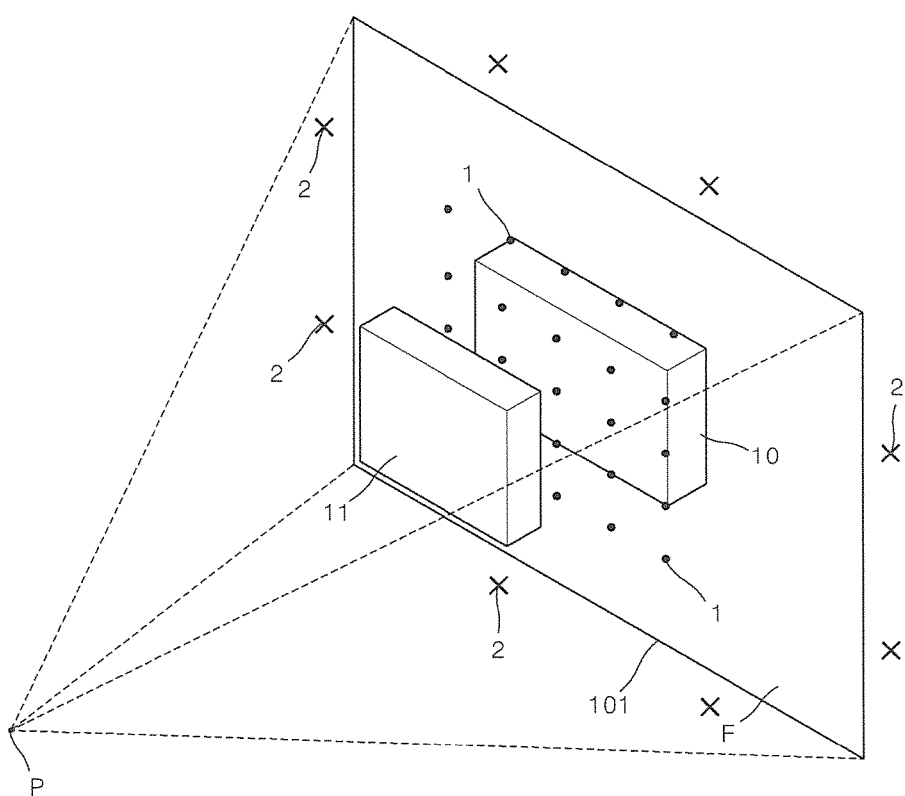
FIGS. 2 through 4 are schematic views illustrating the method of collecting advertisement exposure data of a game video illustrated in FIG. 1.
Figure 3:
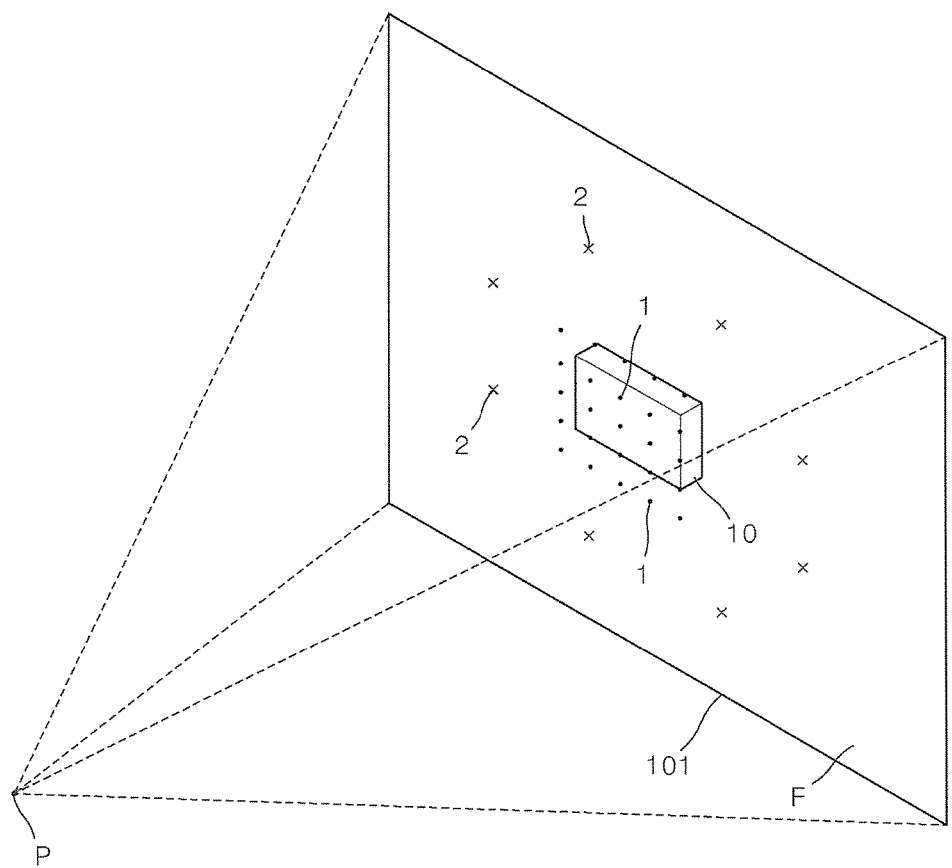

The advertisement objects 10 used according to the present invention further include information about advertisement marks as illustrated in FIGS. 2 and 3. The advertisement marks are arranged at predetermined distances on an outer surface of the advertisement objects 10, on which an advertisement is exposed. The advertisement marks may be defined in various forms. The advertisement objects 10 may be defined to be visible or invisible. According to the present embodiment, an advertisement mark is defined and stored in the form of invisible point coordinates.

The advertisement marks used in the present embodiment are not visually displayed on a game screen but are defined to be identified only by a game engine.

Advertisement marks 1 and 2 of the advertisement objects 10 used according to the present embodiment include two types of advertisement marks, first marks 1 and second marks 2. The first marks 1 are distributed on an outer surface of an advertisement object 10 or around the advertisement object 10, and the second marks 2 are distributed farther away from the advertisement object 10 than the first marks 1.

Each of the advertisement objects 10 stored as advertisement object information as described above is arranged in the virtual space of the game in step (b) (S200). The advertisement objects 10 may be arranged in a game space according to a setup of a game developer, or may be arranged in a game space according to a setup of an advertisement service provider providing an advertising service in a game. Types of the advertisement objects 10 arranged in a virtual space may be varied in real time or contents of the advertisement objects 10 may be adjusted based on the tendency of game players. Game objects may be fixed in a virtual space of a game or may be defined to have a changing or moving shape. The game terminal receives and stores position information and relevant data in connection with the arrangement of the advertisement objects 10 in a virtual game space.

While the game objects and the advertisement objects 10 are arranged in the virtual space, the game terminal displays a game play video, in which the game objects and the advertisement objects 10 are arranged, on a display device 101 of the game terminal in step (c) (S300). As a point of view P and a field of view (FOV) F are adjusted in the virtual space according to user's manipulation, a game situation is rendered on the display device 101. The advertisement objects 10 may be displayed as a billboard or a banner arranged in the virtual space, or may be displayed in the form of a texture on an outer surface of a game object such as a car, a wall or a background.

While receiving a manipulation command of a user (a game command received through an input device such as a keyboard or a joystick) that is input by the user during a game play and displaying a game situation on the display device 101 based on the manipulation command of the user, the game terminal scans the advertisement marks 1 and 2 displayed on the display device 101 and exposed to the field of view F of the virtual space, and identifies and stores identification numbers of the advertisement objects 10 corresponding to the advertisement marks 1 and 2 in step (d) (S400). That is, if the advertisement marks 1 and 2 exposed to the field of view F of the virtual space to be displayed on the display device 101 are present, the game terminal scans the advertisement marks 1 and 2 to identify the advertisement objects 10 corresponding to the advertisement marks 1 and 2 and stores identification numbers of the advertisement objects 10. The game terminal identifies the advertisement objects 10 corresponding to the advertisement marks 1 by scanning only the advertisement marks 1 and 2 exposed on the display device 101 from among the advertisement marks 1 and 2 existing in the field of view F of the virtual space, 2. Even though the advertisement marks 1 and 2 exist within the field of view F of the virtual space, if another object is present between the point of view P and the advertisement marks 1 and 2 and thus the advertisement marks 1 and 2 are not exposed on the display device 101, the advertisement marks 1 and 2 are excluded from objects to be identified to store identification numbers of corresponding advertisement objects 10.

As described above, as the game terminal identifies, in real time, the advertisement objects 10 corresponding to the advertisement marks 1 and 2 by scanning the advertisement marks 1 and 2 exposed to the field of view F, data on the identified advertisement objects 10 may be used as basic data for identifying advertisement objects 10 that are actually visually exposed to the user.

Here, as the game terminal stores times at which marks of the respective advertisement objects 10 are scanned, during step (d) (S400), the game terminal may use the scanning times in determining a period of time during which each of the advertisement objects 10 is exposed while determining whether the advertisement objects 10 are exposed, in step (e) (S500), which will be described later.

Next, by using the advertisement marks 1 and 2 identified in step (d) (S400), the game terminal determines whether an advertisement of the advertisement objects 10 corresponding to the advertisement marks 1 and 2 is exposed, and stores a result of the identifying in step (e) (S500).

Whether the advertisement objects 10 are exposed to the field of view F may be determined using various methods. For example, if only some of the advertisement marks 1 and 2 of a predetermined advertisement object 10 are scanned in step (d), the game terminal may determine that the advertisement object 10 is not exposed, and if all of the advertisement marks 1 and 2 of the advertisement object 10 are scanned from the field of view F, the game terminal may determine that the advertisement object 10 is exposed.

In the present embodiment, the game terminal determines whether the advertisement object 10 is exposed by separately scanning the first marks 1 and the second marks 2, and collects a result of the determining.

If only some of the first marks 1 of the advertisement object 10 are scanned as illustrated in FIG. 2, this indicates that only a portion of the advertisement object 10 is exposed and the other portion of the advertisement object 10 is covered by other object 11. Thus, the game terminal determines that the advertisement object 19 is not exposed.

If all of the first marks 1 are scanned in step (d), this may indicate that the advertisement object 10 is completely exposed to the field of view F. Here, if at least one of the second marks 2 farther away from the advertisement object 10 than the first marks 1 is scanned as illustrated in FIG. 3, this may indicate that the advertisement object 10 is displayed in the field of view F with such a small size that the second mark 2 is also scanned. In this case, although all of the first marks 1 are scanned, the game terminal determines that the advertisement object 10 is not exposed.

Figure 4:
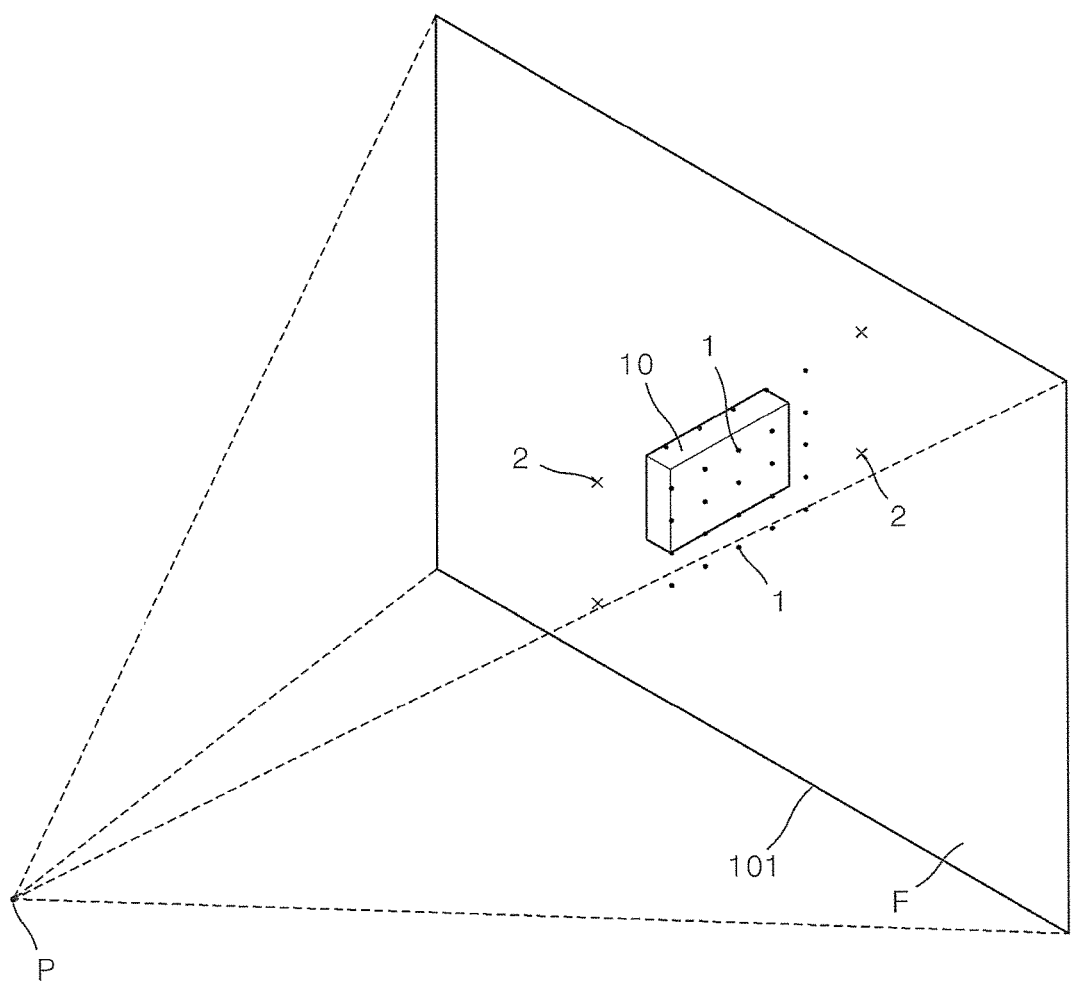

In addition, even if the advertisement object 10 is exposed to the field of view F with an appropriate size, the second marks 2 may also be scanned when a direction of the advertisement object 10 is exposed in a direction away from a gaze of a game player as shown in FIG. 4. In this case, also, the advertisement object 10 is not exposed at an appropriate angle toward the gaze of the game player, and thus, the game terminal determines that the advertisement object 10 is not exposed to the virtual space. When determining whether the advertisement object 10 is exposed or not as described above, the game terminal determines the advertisement object 10 as being exposed only when all of the first marks 1 are scanned and none of the second marks 2 is scanned, and stores an identification number of the advertisement object 10 determined as being exposed and its exposure period.

However, a method of determining whether the advertisement object 10 is exposed may be modified in various manners according to how far the second marks 2 are arranged from the advertisement object 10. For example, it may be set in a method to determine that the advertisement object 10 is exposed if all of the first marks 1 and some of the second marks 2 are scanned, or may be set to determine that the advertisement object 10 is not exposed only when both all of the first marks 1 and all of the second marks 2 are scanned.

Also when the advertisement object 10 is determined to be exposed by using the above-described method, the game terminal may determine that the advertisement object 10 is not exposed if a period during which the advertisement object 10 is exposed is shorter than a preset exposure reference period. The game germinal may store an identification number of the advertisement object 10 by determining the advertisement object 10 as being exposed only when an exposure period of the advertisement object 10 is longer than the exposure reference period so that the advertisement object 10 is able to be recognized by the user via the display device 101.

The exposure reference period may be set to various lengths by considering a game type, a type of the display device 101 or the like, and a value of the exposure reference period may also be set to be varied according to a game play situation.

By determining whether the advertisement objects 10 are exposed to the display device 101 of the game terminal and their exposure periods and collecting and storing information thereon in the above-described process, advertisements that are of more interest of the user may be effectively determined. In addition, the information may be effectively used in charging fees of the advertising services to advertisers.

Meanwhile, the method of collecting advertisement exposure data of a game video according to the present invention may also be performed such that in step (e), the game terminal determines an advertisement object 10 as being exposed only when an angle between a direction in which the advertisement object 10 is exposed in a virtual space and a point of view P in the virtual space displayed on the display device 101 is within a preset angle range. When the angle between the direction in which the advertisement object 10 is exposed and the point of view P in the virtual space is considered as described above, in the case when the advertisement object 10 is disposed in a direction difficult for a user to view even though the advertisement object 10 is located in the field of view F with an appropriate size as illustrated in FIG. 4, the advertisement object 10 may be determined as not exposed. In addition, a case where the advertisement object 10 is in the field of view F but not exposed to the user may be easily filtered without separately treating the advertisement marks 1 and 2 as the first marks 1 and the second marks 2 described above.

According to another embodiment of the method of collecting advertisement exposure data of a game video of the present invention, a distance between a point of view P in a virtual space and the advertisement marks 1 and 2 may be used by the game terminal in determining whether the advertisement object 10 is exposed or not.

While identifying the advertisement objects 10 corresponding to the advertisement marks 1 and 2 scanned from the field of view F in step (d), the game terminal may store distances between the point of view P in the virtual space and each of the advertisement marks 1 and 2 for each of the advertisement objects 10 and use the distance in step (e).

In step (e), the game terminal determines a degree of exposure of an advertisement object 10 by considering the distances between the advertisement marks 1 and 2 and the point of view P stored in step (d). That is, if a distance between the advertisement marks 1 and 2 and the point of view P is too great, the game terminal determines that the advertisement object 10 is not exposed to the user as the advertisement object 10 is displayed on the display device 101 with a too small size. If a distance between the advertisement marks 1 and 2 and the point of view P is too small, the game terminal determines that the advertisement object 10 is not exposed to the user as the advertisement object 10 is displayed on the display device 101 with a too big size so that only a portion of the advertisement object 10 is displayed on the display device 101. That is, the game terminal determines the advertisement object 10 as being exposed only when a distance between the point of view P and the advertisement marks 1 and 2 is within a preset appropriate range.

As described above, a result of identifying whether an advertisement is actually exposed to a user in a replay play video may be used for various purposes. For example, fees of advertisement services may be charged in proportion to a period of time during which an advertisement object 10 is actually exposed to a user. In addition, which of advertisement objects 10 is of the user's interest and viewed by the user for a relatively long period may be identified, and a target advertisement that suits the user's taste may be applied to a game replay video in real time based on data on the identified advertisement objects. Moreover, advertisement objects 10 having a high advertising effect may be determined by accumulating meaningful advertisement exposure periods for each advertisement object 10, and an effective advertising strategy may be established based on data on the determined advertisement objects.

While this invention has been particularly shown and described with reference to various embodiments thereof, the present invention should not be construed as being limited to the embodiments set forth herein; various changes, combinations, and modifications may be made therein without departing from the spirit and scope of the present invention as defined by the appended claims.

What is claimed is:

1. A method of collecting advertisement exposure data of a game video, in which exposure information of an advertisement applied to a game operated by game objects arranged in a three-dimensional virtual space is collected, the method comprising:

(a) storing a plurality of advertisement objects, each including a plurality of advertisement marks arranged on an outer surface on which an advertisement is exposed, wherein each of the advertisement objects has an identification number and is stored as advertisement object information;

(b) arranging the advertisement objects in a virtual space of a game;

(c) displaying a game play video, in which the game objects and advertisement objects are arranged in the virtual space, on a display device of a game terminal;

(d) scanning the advertisement marks exposed to a field of view (FOV) of the virtual space displayed on the display device with respect to a point of view and identifying the identification number of each of the advertisement objects corresponding to the scanned advertisement marks; and (e) determining whether the advertisement of the advertisement object corresponding to the scanned advertisement marks is exposed to the point of view in the virtual space based on the advertisement marks scanned and identified in (d), and storing a result of the determining, wherein in (a), the advertisement marks included in the advertisement object information are stored as point coordinates, and in (c), the game play video is displayed on the display device of the game terminal such that the advertisement marks are invisible.

2. The method of claim 1, wherein in (d), a time when the advertisement marks of each of the advertisement object are scanned is stored.

3. The method of claim 2, wherein in (e), a period of exposure time of the advertisement objects is determined by additionally considering the scanning time of the advertisement marks of the advertisement objects stored in (d).

4. The method of claim 1, wherein in (d), a distance between the advertisement marks scanned from the field of view and a point of view of a virtual space displayed on the display device is stored for each advertisement object, wherein in (e), a degree of exposure of the advertisement objects is determined by additionally considering the distance between the advertisement marks and the point of view stored in (d).

5. The method of claim 2, wherein the advertisement marks of the advertisement objects comprise first marks distributed on an outer surface of the advertisement objects or around the advertisement objects and second marks that are farther away from the advertisement objects than the first marks, wherein in (e), an advertisement object is determined as being exposed if all of the first marks are scanned from among the advertisement marks.

6. The method of claim 5, wherein in (e), an advertisement object is determined as not being exposed if at least one of the second marks from among the advertisement marks is scanned.

7. The method of claim 1, wherein in (e), an advertisement object is determined as being exposed only when an angle between a direction in which the advertisement object is exposed in a virtual space and a point of view in the virtual space displayed on the display device is within a preset angle range.

* * * * *